US006968312B1

(12) United States Patent
Jordan et al.

(10) Patent No.: US 6,968,312 B1
(45) Date of Patent: Nov. 22, 2005

(54) SYSTEM AND METHOD FOR MEASURING AND MANAGING PERFORMANCE IN AN INFORMATION TECHNOLOGY ORGANIZATION

(75) Inventors: Suzanne M. Jordan, Dallas, TX (US); Patrick W. McMahon, Erie, PA (US); David B. McNeill, Raleigh, NC (US); Nora M. Panlilio-Yap, Ellicott City, MD (US)

(73) Assignee: International Business Machines Corporation, Armonk, NY (US)

( * ) Notice: Subject to any disclaimer, the term of this patent is extended or adjusted under 35 U.S.C. 154(b) by 423 days.

(21) Appl. No.: 09/632,341

(22) Filed: Aug. 3, 2000

(51) Int. Cl.[7] ............................................. G06F 17/60
(52) U.S. Cl. .......................................... 705/7; 705/11
(58) Field of Search .................... 702/81–84, 182–186; 703/2, 6; 705/7–11

(56) References Cited

U.S. PATENT DOCUMENTS

| 5,278,751 | A | * | 1/1994 | Adiano et al. ................. 705/10 |
| 5,500,795 | A | * | 3/1996 | Powers et al. ................. 705/11 |
| 5,537,542 | A | | 7/1996 | Eilert et al. ............. 395/184.01 |
| 5,655,086 | A | | 8/1997 | Jury et al. .................... 395/209 |
| 5,684,964 | A | * | 11/1997 | Powers et al. ................. 705/11 |
| 5,903,453 | A | | 5/1999 | Stoddard, II ................ 364/184 |
| 6,023,572 | A | | 2/2000 | Lautzenheiser et al. ...................... 395/500.23 |
| 2001/0025247 | A1 | * | 9/2001 | Nagai et al. .................... 705/7 |

FOREIGN PATENT DOCUMENTS

| EP | 1 072 988 A2 | * | 1/2001 | ........... G06F 17/60 |
| WO | WO 9853416 A1 | * | 11/1998 | ........... G06F 17/60 |

OTHER PUBLICATIONS

Davis, William and Yen, David. "The Information System Consultant's Handbook: systems Analysis and Desig" CRC Press, Boca Raton, Dec. 1, 1998.*
O'Gara, Sarah A., "Record It Without Words: Designing a CPR" , Computers in Healthcare; Oct. 1992.*
Jarzabek, Stan, "The Case for user-centered CASE tools", Association for Computing Machinery. Communications of the ACM; New York Aug. 1998.*
Davis, William and Yen, David. "The Information System Consultant's Handbook: Systems Analysis and Design." CRC Press. Dec. 1998.*
Anonymous. "Researchers Probe Software Quality." Jul. 4, 1988, Advanced Military Computing, vol. 4 No. 14, (2 pages).*
Basili, Victor R.; Caldieri, Gianluigi. "Improve Software Quality by Reusing Knownledge and Experience." Fall 1995, Sloan Management Review, vol. 37, No. 1, p. 55 (10 pages).*

(Continued)

Primary Examiner—Joseph Thomas
Assistant Examiner—Rachael L Porter
(74) Attorney, Agent, or Firm—Shelley M Beckstrand; William E. Schiesser

(57) ABSTRACT

An IT measurement system is aligned with the IT organization's business goals by examining the IT organization's current state-of-affairs with respect to measurement and analyzing how it maps to a proposed measurement model. To ensure the viability of the proposed measurement model, the IT organization and measurement processes it employs are structured to naturally support the collection, analysis, reporting, and use of the measurements in the proposed model. The measurement model and associated techniques work from a top-down approach, starting with the goals of the organization, identifying appropriate behaviors and finally associating measures that will empirically demonstrate achievement of the behaviors. In addition, algorithms for prioritization are executed to ensure that the best fitting measures are selected in the final measurement model.

24 Claims, 8 Drawing Sheets

OTHER PUBLICATIONS

Feurer, Rainer and Chaharbaghi, Kazem. "Performance Measurement in Strategic Change." Benchmarking for Quality Management and Technology. 1995 vol. 2, No. 2, pp. 64.*

Basili, Victor R. et al. "The Goal Question Metric Approach", Institute for Advanced Computer Studies, Department of Computer Science, University of Maryland, College Park, Maryland.

* cited by examiner

SYSTEM AND METHOD FOR MEASURING AND MANAGING PERFORMANCE IN AN INFORMATION TECHNOLOGY ORGANIZATION

BACKGROUND OF THE INVENTION

1. Technical Field of the Invention

This invention pertains performance management. More particularly, it relates to measuring and managing the performance of an information technology (IT) organization.

2. Background Art

Developing a system that measures the performance of an IT organization is critical to managing the IT organization and continually improving the processes that it employs over time. However, no regular, canonical method for developing a system that measures the performance of an IT organization is evident in the industry. The lack of such a method creates great difficulty in understanding the performance of the IT organization, and this is a critical aspect to successful management and improvement of the IT organization over time. This problem has existed since the formation of IT organizations. Consequently, there is a need in the art for a repeatable work product-based method for defining and implementing a measurement program for an IT organization.

There is a need in the art for a system and method for providing measurement gap analysis describing the relationship between the measurement system and the underlying organization and processes. Without appropriate organizational and process support, it is difficult for any measurement system to achieve maximum potential usefulness. Measurement systems that are supported by the appropriate organizational structure and are fully integrated with the organizations process have a much higher probability of being effective.

It is an object of the invention to provide a system and method for systematically defining and implementing a measurement program.

It is a further object of the invention to provide a system and method for implementing a measurement program that is supported by an appropriate organizational structure and that is fully integrated with the organization's processes.

It is a further object of the invention to provide a system and method for identifying and defining measurements necessary to support the management of an IT organization.

It is a further object of the invention to provide a system and method for linking defined measurements to organization goals and objectives.

It is a further object of the invention to provide a system and method of integrating measurement ownership into an organizational model.

It is a further object of the invention to provide a system and method for integrating measurement data collection into an IT process model.

It is a further object of the invention to provide a system and method for developing a technical environment for supporting measurement data collection, analysis and reporting.

It is a further object of the invention to provide a system and method for developing the technical interfaces necessary to support measurement data collection.

It is a further object of the invention to provide a system and method for developing measurement reporting methods.

It is a further object of the invention to provide a system and method for developing training and end-user support materials for a measurement system.

SUMMARY OF THE INVENTION

A system and method for defining and implementing measurements to support a customer information technology organization. Steps involve identifying customer performance goals; building a model in response to customer goals including a plurality of primitive metrics; performing a gap analysis of the model to determine which of the primitive metrics are already collected by the organization and the process capabilities to support the data collection; identifying new data collection sources for the primitive metrics which are not already collected by the organization; and implementing the tools and processes for gathering all of the primitive metrics and tools for generating measurement reports from the gathered primitive metrics.

In accordance with a preferred embodiment of the invention, measures of performance of a customer information technology organization are determined by defining the organization goals, identifying the behaviors that the organization exhibits when working toward or meeting the defined goals, identifying and defining the measurements that provide empirical evidence on the achievement and attainment of the desired behaviors, balancing the defined measurement categories, and prioritizing the measurements for implementation based on the balance.

Other features and advantages of this invention will become apparent from the following detailed description of the presently preferred embodiment of the invention, taken in conjunction with the accompanying drawings.

BEST MODE FOR CARRYING OUT THE INVENTION

Figure 1:
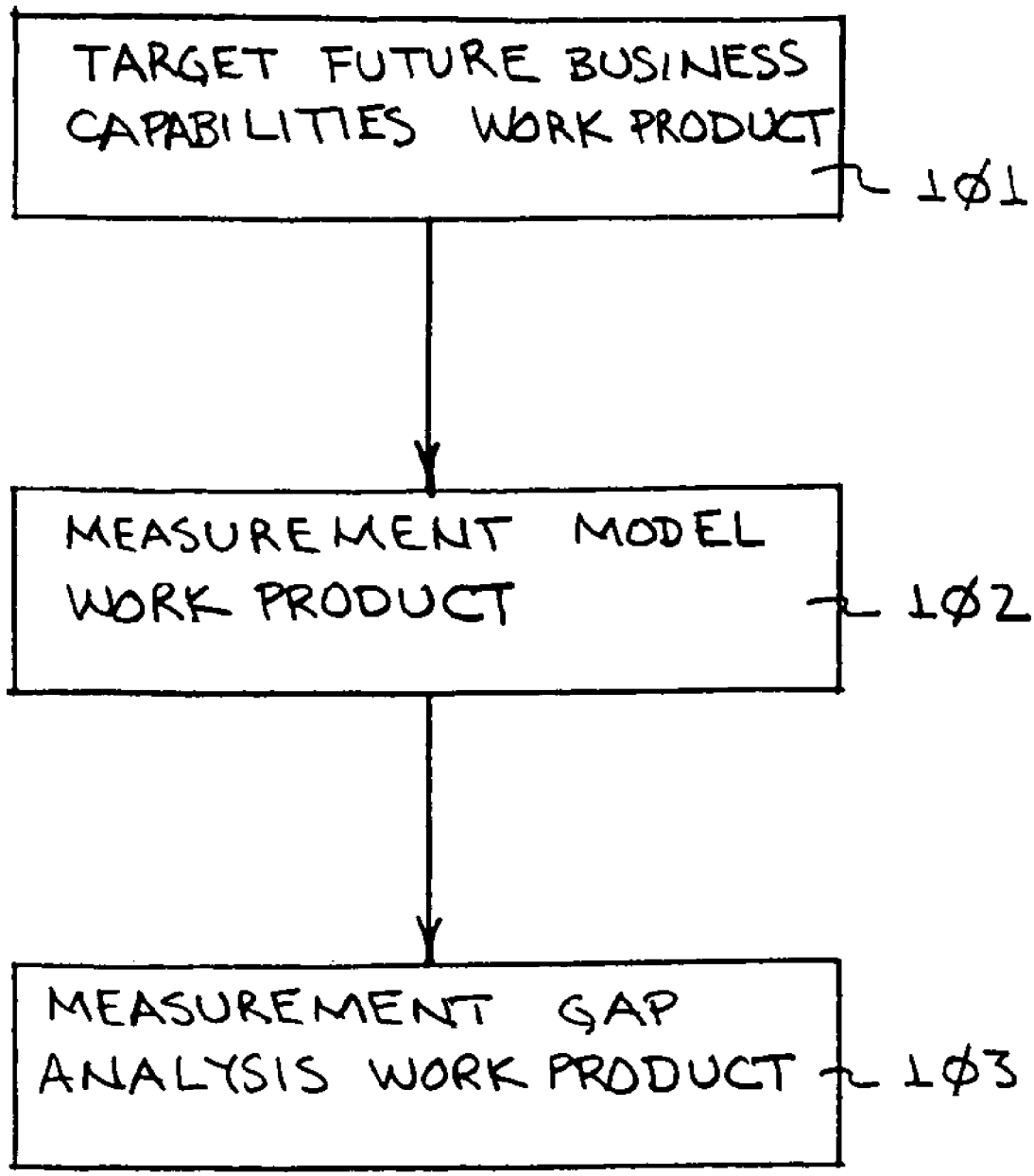
FIG. 1 is high level flow diagram illustrating the context of the method of a preferred embodiment of the invention.

Referring to FIG. 1, the process of the preferred embodiment of the invention for creating a measurement model work product 102 is part of the requirements phase of the measurement and performance management(MAPM) methodology. This process relies on input from a target future business capabilities work product 101 and provides critical input into the measurement gap analysis work product 103. Measurement model 102 represents the core of requirements for the MAPM method and is used as the basis for developing process and organizational linkages, and many other technical work products to support its implementation with an information technology (IT) organization. A more detailed description of the process for creating measurement model work product 102 will be provided hereafter, particularly in connection with FIG. 6.

Figure 2:
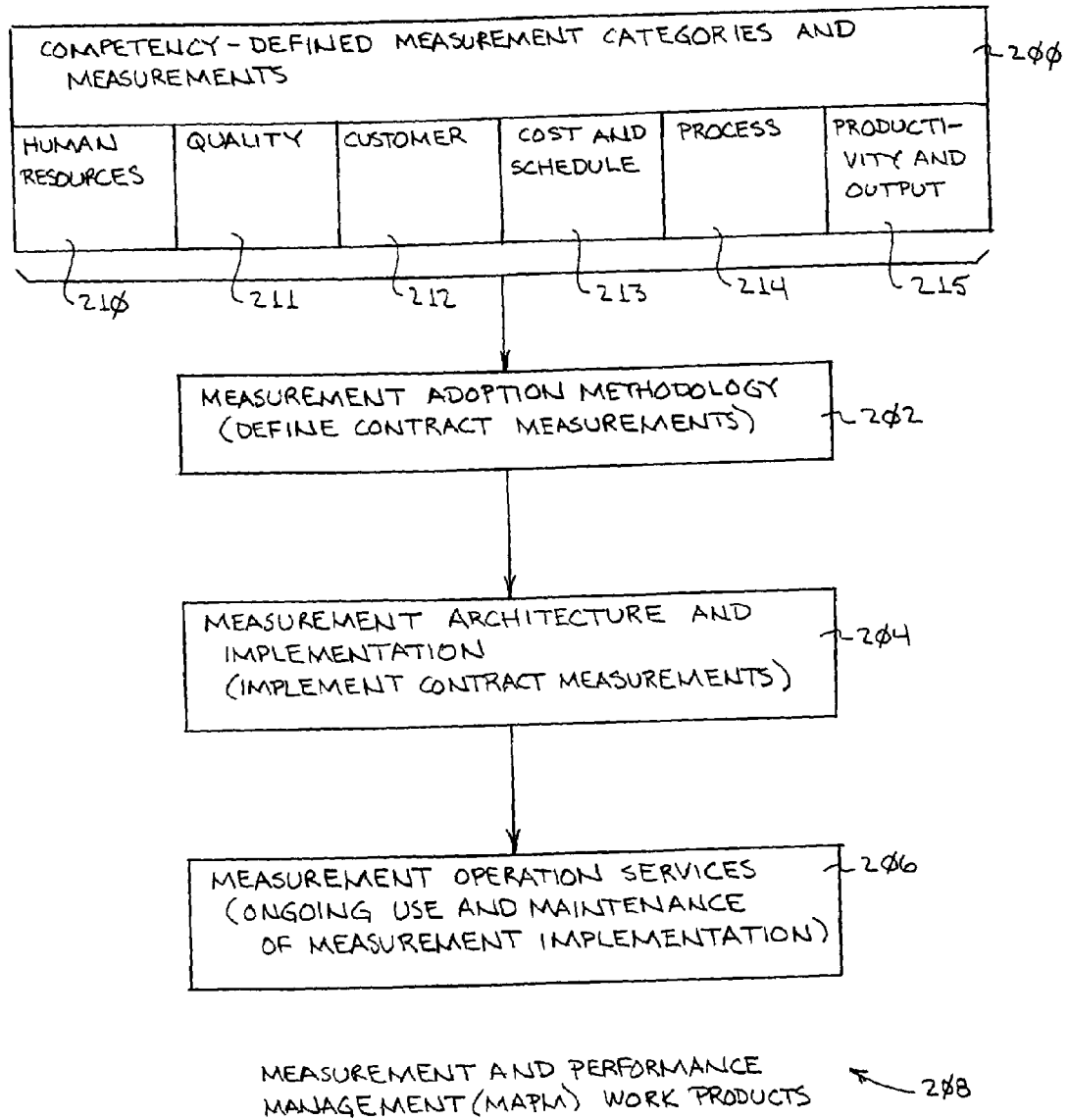
FIG. 2 is a high-level overview of the measurement and performance management (MAPM) method of a preferred embodiment of the invention.

Referring to FIG. 2, a high level view of the method of a preferred embodiment of the invention includes in step 200 collecting into a competency-defined measurement categories and measurements file definitions of human resources 210, quality 211, customer 212, cost and schedule 213, process 214, and productivity and output 215 measurement parameters. In step 202, a measurement adoption method is executed, thereby selecting and defining contract measurements. In step 204, a measurement architecture and implementation method is executed to implement the contract measurements. In step 206, a measurement operations services method is executed to implement ongoing use and maintenance of measurements. As is represented by step 208, measurement program work products are produced and used throughout steps 200–206.

Figure 3A:
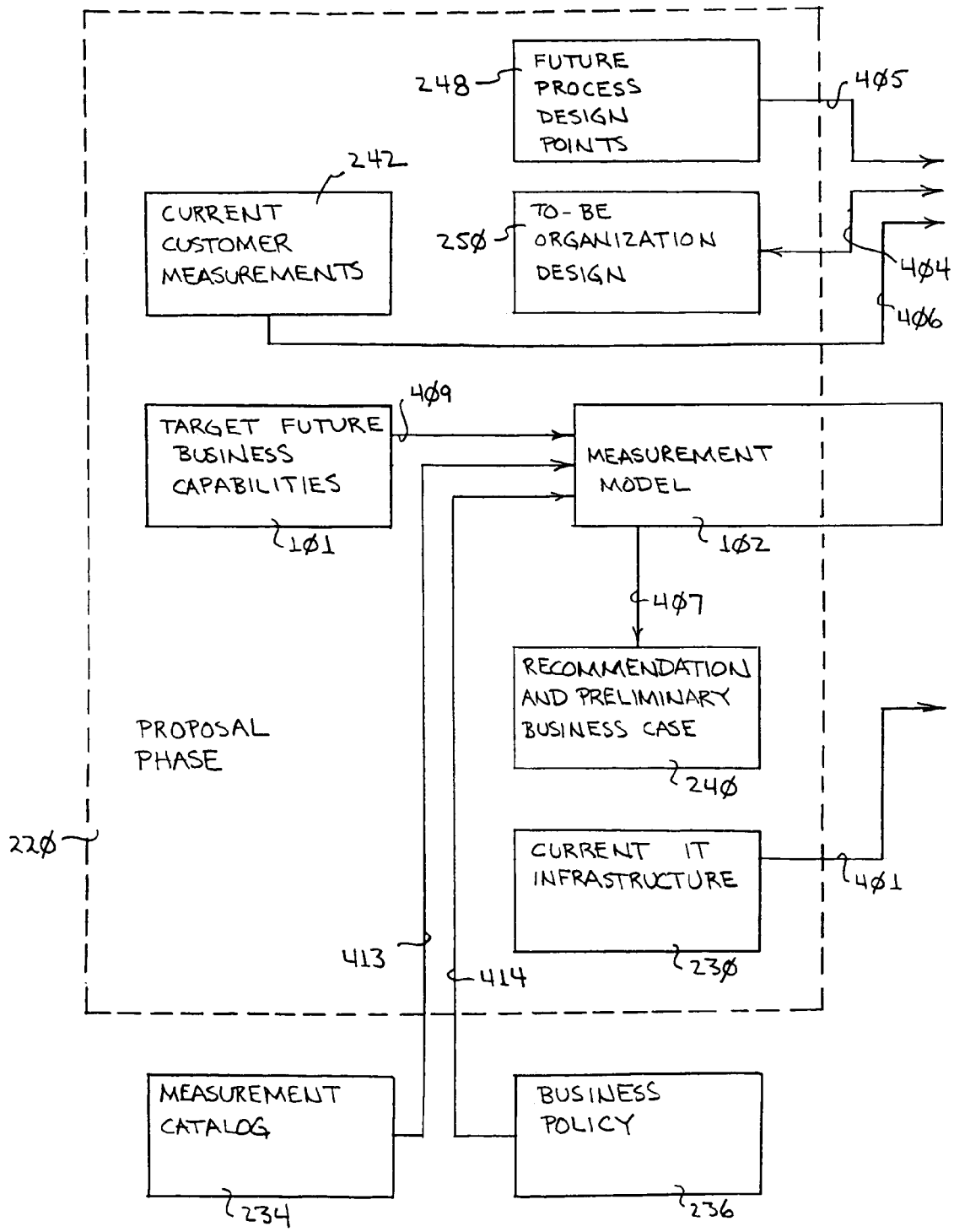
FIG. 3 is a diagram detailing the high-level overview of the MAPM method of FIG. 2 from a work product-based view.
Figure 3B:
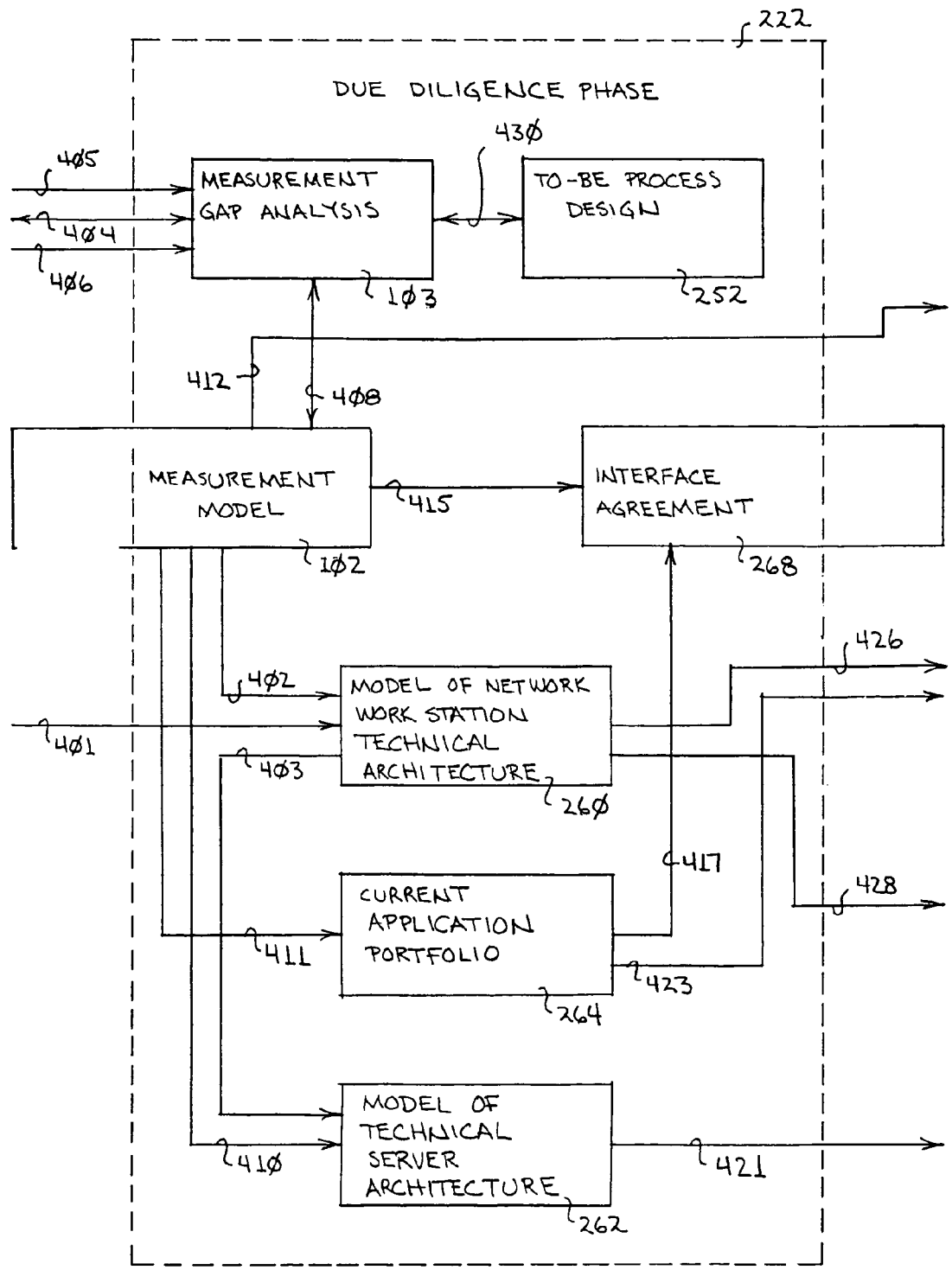
Figure 3C:
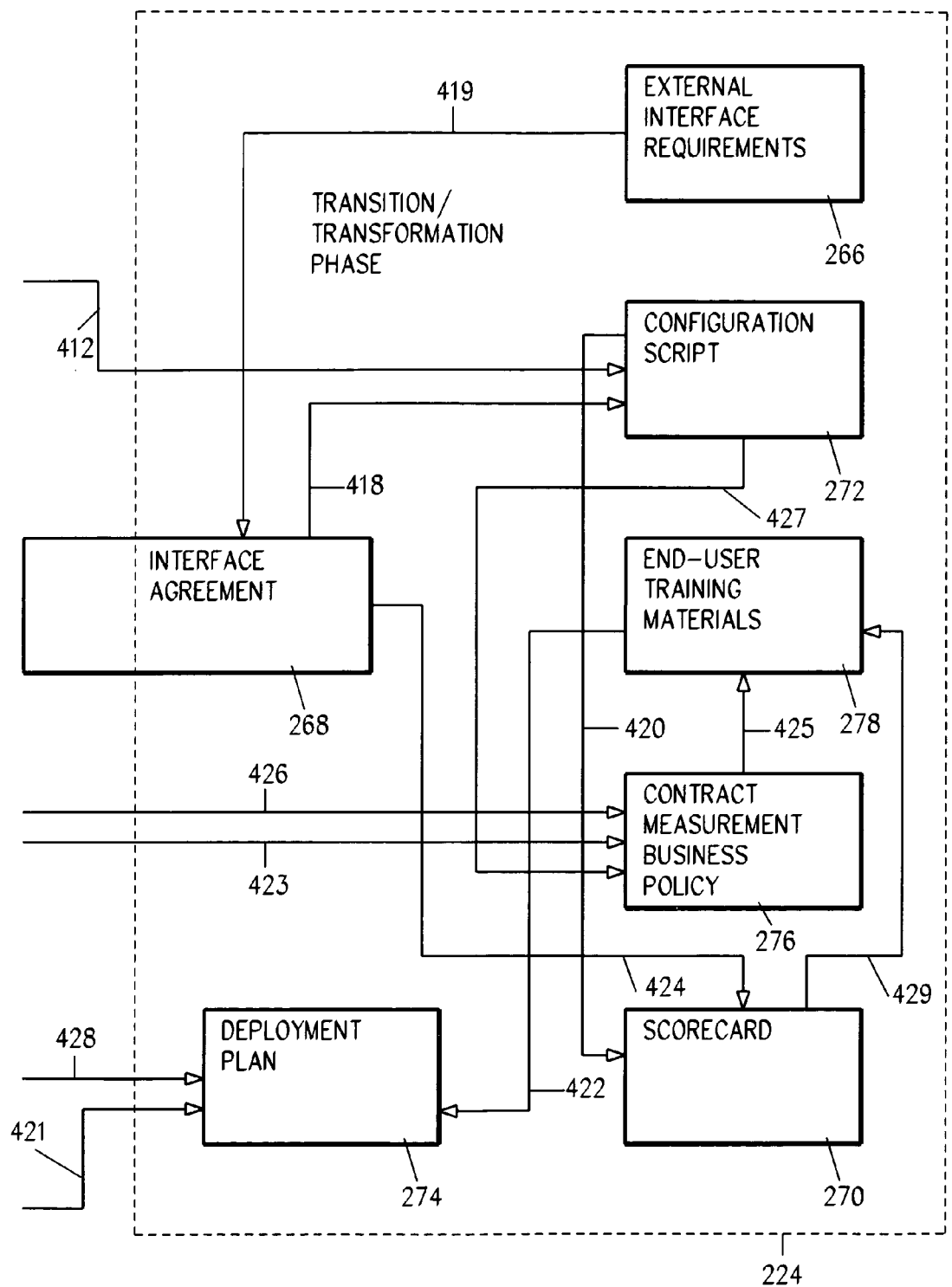

Referring to FIG. 3, the system and method of the preferred embodiments of the invention are built upon the IBM Work Product-based Methodology Development Approach as defined and implemented by Solution Consulting Integration (SCI) practice through its SCI Enablement Process and new work products which extend the SCI method. These new work products include three work products representing the formulation of the measurement requirements that are to be implemented in an engagement, and are illustrated in FIG. 3 as measurement model 102, current customer measurements 242, and measurement gap analysis 103. These new work products also include four work products representing additional implementation and/ or technical requirements to support the implementation of measurement model 102, and include interface agreement 268, configuration script 272, contract measurement business policy 276, and scorecard 270.

Practitioner accesses to the documents that are the work products of the preferred embodiment of the method of the invention may be, for example, by way of HTML code that provides users of the method access to work product (WP) dependency diagrams, engagement models, work product description papers and work product technique papers. Similarly, such documents may be maintained in collaboration space, and available based on access controls, to members of development, marketing and implementation teams throughout an enterprise. The IBM QuickPlace (TM) provides such a collaboration space. The Lotus Domino/Notes (TM) may also be used to control access using access control lists and provide consistency among several instances of data using replication.

An MAPM engagement includes three contextual phases 220, 222, and 224. Proposal phase 220, in the context of developing a measurement solution, represents the development of the initial solution specifications, including costs, that are to be delivered to a customer. Due diligence phase 222 represents the validation of assumptions and expectations that are made in developing a proposal to the customer before an outsourcing agreement is signed. Transition/transformation phase 224 represents the first major group of activities that occur once a legal contract for outsourcing has been established. This is where the transfer of resources and assets occurs and the implementation of specific new processes and procedures is introduced into this new organization.

Proposal phase 220 includes the following work products: current customer measurements 242, target future business capabilities 101, future process design points 248, to-be organization design 250, measurement model 102, recommendation and preliminary business case 240, and current IT infrastructure 230. Other work products providing input to proposal phase 220 include measurement catalog 234 and business policy 236.

Due diligence phase 222 includes the following work products: measurement gap analysis 103, to-be process design 252, measurement model 102, interface agreement 268, model of network workstation technical architecture 260, current application portfolio 264, and model of technical server architecture 262.

Transition/transformation phase 224 includes the following work products: interface agreement 268, deployment script 272, end-user training materials 278, contract measurement business policy 276, and scorecard 270.

As is represented by line 401, current IT infrastructure work product 230 provides input to model of network workstation technical architecture work product 260.

As is represented by line 402, measurement model work product 102 provides input to architecture work product 260.

As is represented by line 403, technical architecture work product 260 provides input to model of technical server architecture 262.

As are represented by lines 404, 405, and 406, inputs to measurement gap analysis work product 103 come from to-be organization design work product 250, future process design points work product 248, and current customer requirements work product 242, respectively, with feedback to to-be organization design work product 250 from measurement gap analysis work product 103.

As is represented by line 407, measurement model work product 102 provides input to recommendation and preliminary business case work product 240.

As is represented by line 408, measurement gap analysis 103 and measurement mode 102 feed each other.

As is represented by line 409, target future business capabilities work product 101 provides input to measurement model 102, as further described above in connection with FIG. 2.

As is represented by lines 410, 411, 412 and 415, measurement model work product 102 provides inputs to model of technical server architecture work product 262, current application portfolio work product 264, configuration script work product 272 and interface agreement work product 268, respectively.

As is represented by lines 413 and 414, measurement model work product 102 receives inputs from measurement catalog work product 234 and business policy work product 236, respectively.

As is represented by lines 417 and 423, current application portfolio work product 264 provides inputs to interface agreement work product 268 and contract measurement business policy work product 276.

As is represented by lines 418 and 424, interface agreement work product 268 provides inputs to configuration script work product 272 and scorecard 270, respectively.

As is represented by line 419, external interface requirements work product 266 provides input to interface agreement 268.

As is represented by lines 420 and 427, configuration script 272 provides inputs to scorecard 270 and contract measurement business policy work product 276, respectively.

As is represented by line 421, model of technical server architecture work product 262 provides input to deployment plan work product 274.

As is represented by line 422, end-user training materials work product 278 provides input to deployment plan work product 274.

As is represented by line 425, contract measurement business policy work product 276 provides input to end-user training materials work product 278.

As is represented by lines 426 and 428, model of network workstation technical architecture work product 260 provides inputs to contract measurement business policy work product 276 and deployment plan work product 274, respectively.

As is represented by line 429, scorecard work product 270 provides input to end-user training materials 278.

As is represented by line 430, measurement gap analysis work product 103 and to-be process design work product 252 exchange inputs and outputs.

Current IT infrastructure 230 describes the physical systems and network configurations of the customer.

Target future business capabilities 101 defines the customer's goals and objectives, necessary to achieve through measurements.

Measurement catalog 234 is the intellectual capital that contains the results of all previous engagements, and is used to support new engagements in the selection of measurements.

Business policy 236 represents optional intellectual capital describing business policies.

Measurement model 102 defines the key requirements for the engagement, represents the translation of target future business capabilities 101 into account specific behaviors, and includes measures that empirically demonstrate those behaviors. The process implemented by measurement model 102 will be further described hereafter in connection with FIGS. 5 and 6.

Recommendation and preliminary business case 240 defines high level cost benefit estimates on the technical solutions that might be considered for measurement model implementation.

Current customer measurements 242 provides a detailed list of the measurements that are being collected and reported currently by the customer.

Future process design points 248 provides high level requirements for developing the to-be process design 252.

To-be organization design 250 is the planned organization model.

To-be process design is 252 is the planned processes model.

Model of network/workstation technical architecture 260 is a systems view of the hardware and software that supports the end users of the measurement system.

Model of technical server architecture 262 is a systems view of the hardware and software server that supports the measurement system implementation and the system's end users.

Current application portfolio 264 is a detailed list of the applications that are being supported by the vendor/service organization.

External interface requirements 266 is a detailed list of the outside systems that the measurement system must interface in order to perform data collection or data extraction.

Interface agreement 268 is a formal agreement between systems to ensure that expectations for data collection are appropriately documented.

Scorecard 270 is the visualization (reporting) requirements of the measurement system.

Configuration script 272 is the code necessary to configure the tools used to implement the measurement model.

Deployment plan 274 is the project plan for implementing the system in the organization.

Contract measurement business policy 276 provides the basic expectations of behavior on the account that must be conformed to in order to support data collection, reporting and analysis for the measurement system.

End user training materials 278 are educational materials used to teach the organization about the measurement system and its supporting tools.

Developing a system that measures the performance of an IT organization is critical to managing the IT organization and continually improving the processes that it employs over time. In accordance with a preferred embodiment of the invention, an IT measurement system is aligned with the IT organization's business goals by examining the IT organization's current state-of-affairs with respect to measurement and analyzing how it maps to a proposed measurement model. To ensure the viability of the proposed measurement model, it is important the IT organization be structure to support the model and that the processes employed within the organization lend themselves to naturally support the collection, analysis, reporting, and use of the measurements in the proposed model. In accordance with a preferred embodiment of the invention, a method is provided for systematically analyzing how the IT organization's current measurement system, if one exists, maps to the proposed measurement model and for identifying impacts to the to-be organization design and the to-be process design.

Measurement gap analysis 103 defines the difference between the measurement model 102 and current customer measurements 242, additionally, with reference to to-be organization design 250 and to-be process design 252, considering possible deficiencies in the organization model and organization processes.

Heretofore organizations in industry, while recognizing the need for establishing or improving measurement systems, have done so through a project-level perspective. In accordance with the system and method of the preferred embodiment of the invention, measurement gaps are addressed at the contract or program level. The gaps which are identified include gaps in the measures to be collected, analyzed, reported, and used, together with the critical relationship of measurements to the underlying organization structure and the processes that the organization employs.

Figure 4:
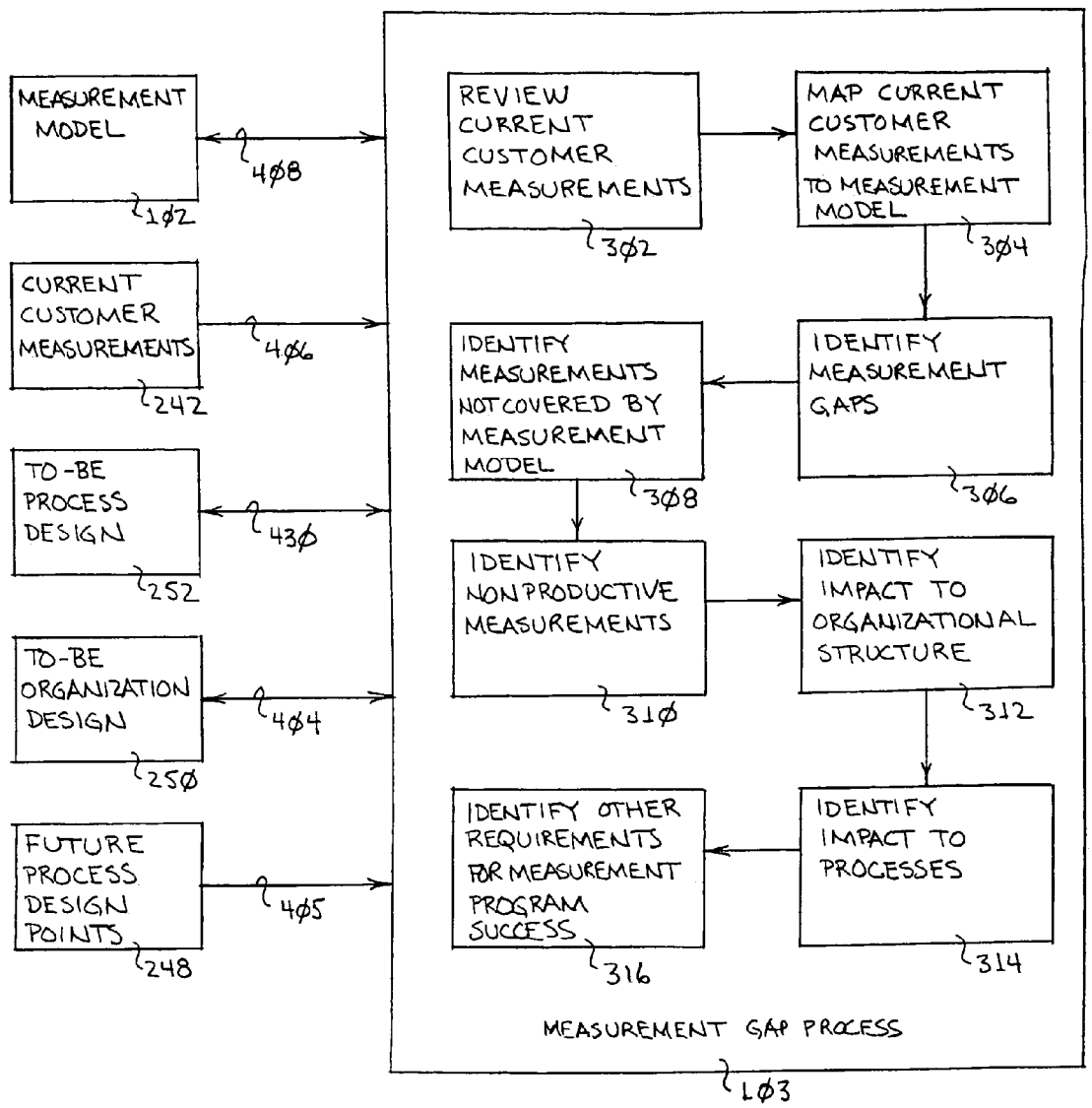
FIG. 4 is a diagram illustrating the measurement gap analysis embodiment of the invention.

Referring to FIG. 4, a flow diagram of the measurement gap method of a preferred embodiment of the invention illustrates the inputs and outputs and the steps executed in developing measurement gap analysis work product 103.

In step 302, current customer measurements 242 are reviewed.

In step 304, current customer measurements 242 are mapped to measurement model 102.

In step 306, measurement gaps are identified.

In step 308, measurements not covered by the measurement model are identified.

In step 310, non-productive measurements are identified.

In step 312, the impact to the existing organizational structure is identified.

In step 314, the impact to processes is identified.

In step 316, other requirements for measurement program success are identified.

The canonical method of the preferred embodiment of the invention for developing a system that measures the performance of an IT organization involves identifying measures for an IT organization that are directly tied to goals and behaviors that the IT organization should be exuding, as defined by the IT management team. "Canonical" means fully thought through and consistent. The measurement model work product 102 and associated techniques work from a top-down approach, starting with the goals of the organization, identifying appropriate behaviors and finally associating measures that will empirically demonstrate achievement of the behaviors. In addition, algorithms for prioritization are executed to ensure that the best fitting measures are selected in the final measurement model.

Figure 5:
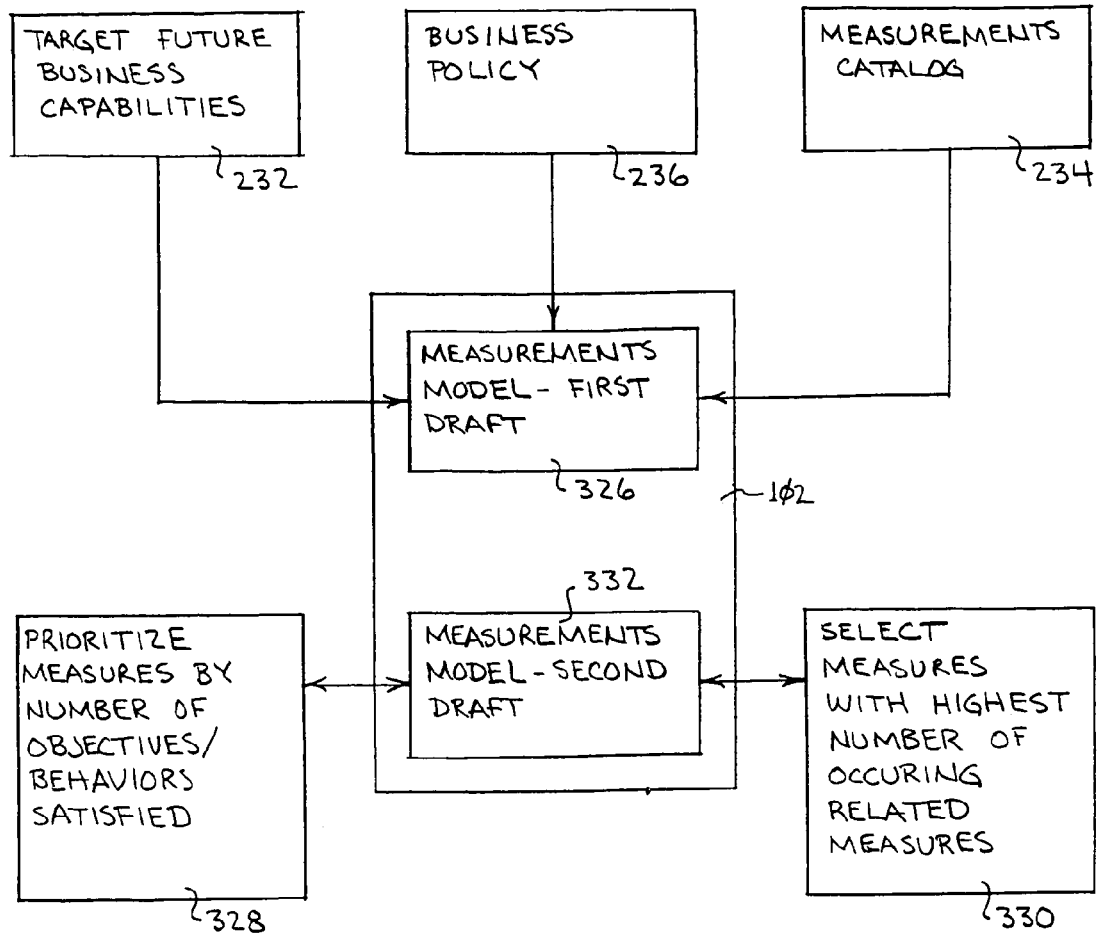
FIG. 5 is a diagram illustrating a measurement model for an IT organization including the notion of behaviors in accordance with a preferred embodiment of the invention.

Referring to FIG. 5, this canonical process for defining measurements model work product 102 includes in step 232 articulating the envisioned to-be business goals through a series of goals and questions or behaviors. In step 236, in an optional, more specific embodiment, standard business policy driving behaviors that are assumed or expected are defined. In step 234, a measurements catalog of industry measurements are enumerated and fully defined in a database of existing contract measurements, including behaviors and goals that they satisfy.

In step 326, an intellectual mapping is done between the envisioned to-be business goals and potential measures. A prioritization and balancing process is applied to ensure that the best measures are selected. This step 326 involves a two step prioritization and balancing process including, in step 328, prioritization of measures by number of objectives and behaviors satisfied, and in step 330 identification of measures that have the highest number of occurring related measures in the same or another category.

The method of the preferred embodiment of the invention draws upon several concepts from goals-question-metric (GQM) techniques described in Basili, Victor et al., "The Goal Question Metric Approach," Institute for Advanced Computer Studies, Department of Computer Science, University of Maryland, College Park, Md. To this are added notions of behaviors as a bridge between organizational goals and the identification and definition of measures that enable the required behaviors attempting to occur. The inclusion of behaviors in the overall technique implemented by the preferred embodiment of the invention creates a more tightly integrated measurement model especially when dealing with measurement definition at the IT organization level, where business drivers and other organizational objectives form the basis of measurement requirements. Behaviors are the performance expectations of the individuals affected by the measurement model. These could be new ways of acting or new areas of focus in the respective roles on the account.

Figure 6:
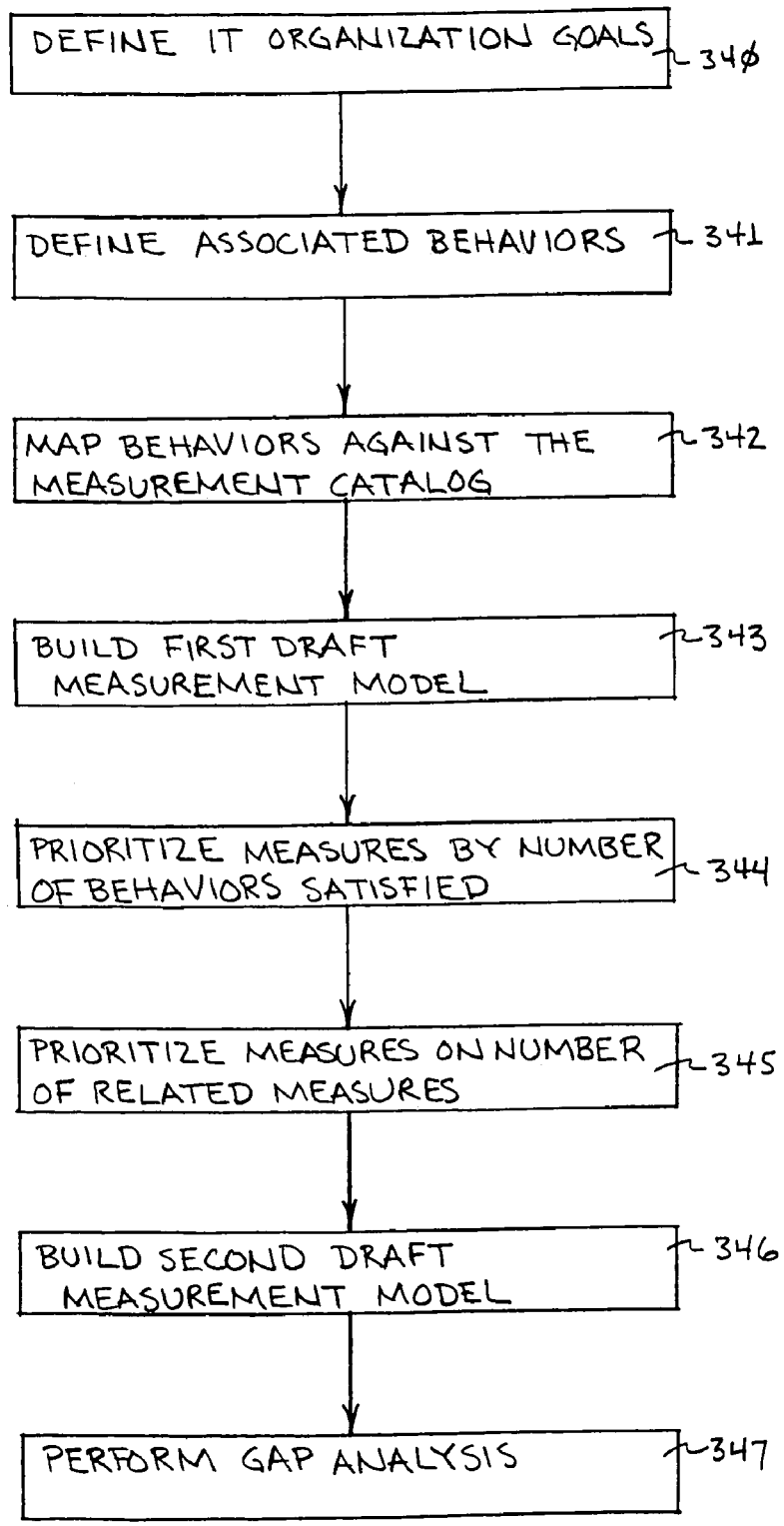
FIG. 6 is a flow chart illustrating in greater detail the notion of behaviors in the process of FIG. 5.

Referring to FIG. 6 in connection with FIG. 5, a more detailed description of this canonical process includes, in step 340, defining the IT organization goals; in step 341, defining associated behaviors; in step 342, mapping behaviors against the measurement catalog; in step 343, building a first draft measurement model; in step 344 prioritizing measures by number of behaviors satisfied; in step 345, prioritizing measures on number of related measures; in step 346 building a second draft measurement model 332; and in step 347 performing gap analysis. Each of these steps will be further described.

In step 340, IT organization goals are identified during the creation of target future business capabilities work product 101. Typically, the goals of the organization are broken out into one or more categories of measures. In accordance with the preferred embodiment of the invention, these six categories include those previously discussed in connection with FIG. 2, and are human resources 210, quality 211, customer 212, cost and schedule 213, process 214, and productivity and output 215.

In step 341, behaviors that best demonstrate achievement of a particular organizational goal are defined. For each of the organization goals defined in target future business capabilities work product 101, one or more behaviors are defined. Similar in concept to the question aspects of the GQM approach, behaviors are defined to represent those characteristics the IT organization should foster as part of its normal operations. Behaviors identify an end state that should be directly tied to the organizations goals.

As an example, if the organization's goal is in the area of ensuring that appropriate processes exist in the IT department, several behaviors might be identified, such as (1) the ability of the organization to forecast process needs, that is processes that should exist today but do not); (2) the knowledge of the IT staff of existing processes; (3) the ability to manage to process gaps; and (4) the consistent use and adherence to documented processes.

Behaviors are typically simple sentence structures and may even be incomplete sentences. They are short statements that represent ideas, actions or activities that demonstrate commitment and refinement of the organization goals. Typically, the organization goals are expressed as high level statements or highly summarized notions. Behaviors are intended to be a level or two below the organization goals and bring about a level of granularity low enough to support identification of measures that might empirically demonstrate achievement of the desired behaviors.

A sample table for capturing the results of this step 341 is included in Table 1: Goals, Behaviors, and

TABLE 1

GOALS, BEHAVIORS, AND MEASUREMENTS

| Goal 1 | Behavior 1 | Measurement 1 |
| Goal 2 | Behavior 2 | Measurement 2 | where measurements are those identified in step 342, infra.

In step 342, those measurements from the measurement catalog 234 that best satisfy the identified behaviors are identified. This catalog is a database accessed using associated behaviors as a search parameter.

In step 343, the first draft 326 of measurement model 102 is built. This involves documenting the results of step 342 in the measurements column of Table 1 and in measurements model 326. In addition, other attributes of the measures are captured in measurement model 326, with their base values coming from measurement catalog 234. Table 2 illustrates the fields in measurements model 326 for capturing measurements and other attributes.

TABLE 2

MEASUREMENTS MODEL FORMAT

| FIELD NAME | DESCRIPTION |
|---|---|
| MEASUREMENT NAME | NAME OF THE MEASURE |
| MEASUREMENT DEFINITION | ITS DEFINITION |
| ELEMENTAL METRICS | WHAT IS THE ELEMENTAL DATA REQUIRED TO CALCULATE THE MEASURE? |
| MEASUREMENT CALCULATION | HOW IS THE MEASURE CALCULATED? |
| RELATED MEASUREMENTS | WHAT RELATED MEASURES EXIST FOR THIS MEASUREMENT? |
| FREQUENCY OF DATA CAPTURE | HOW OFTEN IS DATA FOR THIS MEASURE COLLECTED? |
| FREQUENCY OF MEASUREMENT REPORTING | HOW OFTEN ARE THE RESULTS OF THIS MEASURE REPORTED? |

TABLE 2-continued

MEASUREMENTS MODEL FORMAT

| FIELD NAME | DESCRIPTION |
|---|---|
| REPORTING PROCESS | WHAT I.T. PROCESS TYPICALLY REPORTS THIS DATA? |
| EVENT TRIGGER | WHAT EVENT OR STEP IN THE PROCESS TRIGGERS THE AVAILABILITY OF THIS DATA |
| ORGANIZATIONAL OWNER | NAME OF ORGANIZATIONAL OWNER |

In step 344, a first prioritization exercise 328 is performed on the measures in the first draft 326 of measurement model 102. For each of the measures (aka metrics) identified in step 342, a table is built that describes the relationship with each of the behaviors it may satisfy. In many cases, a single measure may actually satisfy more than one behavior. This is important in the identification and selection of measures, since it is most desirable to keep the final number of measures, or metrics, to a minimum. This prioritization process is done for each of the categories of the measurement model 102. Table 3, First Prioritization Example: People Measurements, illustrates how to capture the prioritization in this step 344.

TABLE 3

FIRST PRIORITIZATION EXAMPLE: PEOPLE MEASUREMENTS

PART A

| | BEHAVIORS/MEASUREMENTS | | | |
|---|---|---|---|---|
| PEOPLE BEHAVIORS | JOB SATIS-FACTION | TURNOVER RATE | REASONS FOR EXIT | CERTIFICATION PROGRAM EFFECTIVENESS |
| FORECAST SKILLS NEED ON A ROLLING X MONTH BASIS | | X | | |
| KNOW/MONITOR THE CURRENT SKILLS | | X | | |
| MANAGE TO THE SKILLS GAP | | | | |
| ACTIVELY MANAGE ENVIRONMENTAL ISSUES | X | | X | |
| PLAN AND MANAGE TO SHORT-TERM AND LONG-TERM USAGE OF CONTRACTORS | | | | |
| MANAGE TO THE REDUCTION OF LONG-TERM CONTRACTOR DEPENDENCIES | | | | |
| RECRUIT ENTRY LEVEL STAFF TO MEET A PORTION OF FUTURE SKILLS NEED | | | | |
| HIRE EXPERIENCED PEOPLE TO FILL IMMEDIATE SKILL NEEDS, WHICH ARE LONG-TERM IN NATURE | | | | |
| PROACTIVELY MANAGE RECRUITMENT UNTIL NEW HIRES ARE ON-BOARD | | | | |
| PROACTIVELY FOSTER LONG-TERM RELATIONSHIPS WITH LOCAL RECRUITMENT SOURCES | | | | |
| CREATE AN ENVIRONMENT ATTRACTIVE TO TARGETED RECRUITS | X | | X | |
| MEASUREMENT SUBTOTAL | 2 | 2 | 2 | 0 |

PART B

| | BEHAVIORS/MEASUREMENTS | | | |
|---|---|---|---|---|
| PEOPLE BEHAVIORS | CONTRACTOR ENGAGEMENT DURATION | CONTRACTOR USAGE | UNFILLED POSITIONS | JOB OFFER ACCEPTANCE RATE |
| FORECAST SKILLS NEED ON A ROLLING X MONTH BASIS | | | | |
| KNOW/MONITOR THE CURRENT SKILLS | X | X | X | |
| MANAGE TO THE SKILLS GAP | | X | X | |
| ACTIVELY MANAGE ENVIRONMENTAL ISSUES | | | | |

TABLE 3-continued

| FIRST PRIORITIZATION EXAMPLE: PEOPLE MEASUREMENTS | | | | |
|---|---|---|---|---|
| PLAN AND MANAGE TO SHORT-TERM AND LONG-TERM USAGE OF CONTRACTORS | X | X | | |
| MANAGE TO THE REDUCTION OF LONG-TERM CONTRACTOR DEPENDENCIES | X | X | | |
| RECRUIT ENTRY LEVEL STAFF TO MEET A PORTION OF FUTURE SKILLS NEED | | | X | |
| HIRE EXPERIENCED PEOPLE TO FILL IMMEDIATE SKILL NEEDS, WHICH ARE LONG-TERM IN NATURE | X | | X | |
| PROACTIVELY MANAGE RECRUITMENT UNTIL NEW HIRES ARE ON-BOARD | | | | X |
| PROACTIVELY FOSTER LONG-TERM RELATIONSHIPS WITH LOCAL RECRUITMENT SOURCES | | | | |
| CREATE AN ENVIRONMENT ATTRACTIVE TO TARGETED RECRUITS | | | | |
| MEASUREMENT SUBTOTAL | 4 | 4 | 4 | 1 |

The measurement subtotal scores in Table 3 are derived from simple counts of the numbers of X's in each of the columns. Those measures with the highest scores satisfy the most number of behaviors and are more desirable as measures in the model since they provide more knowledge and insight for the cost of implementation. Of course, the table could be modified to reflect weighting factors on both cost and effectiveness, but such is not deemed essential for this embodiment of the invention.

In step 345, the second prioritization process 330 is performed on the measurements in the first draft 326 of measurement model 102. For each of the measures identified in step 342, a table is built that describes the related measure. In many cases a single measure may actually be related to more than one measure. This is important in the identification and selection of measures, since it is most desirable to keep the final number of measures to a minimum. This prioritization process 330 is done for each of the categories of the measurement model. Table 4, Second Prioritization Example: People Measurements, illustrates how to capture the prioritization in this step 345.

TABLE 4

| SECOND PRIORITIZATION EXAMPLE: PEOPLE MEASUREMENTS | | | | |
|---|---|---|---|---|
| PART A | | | | |
| PEOPLE MEASUREMENTS | | | | |
| PEOPLE MEASUREMENTS | JOB SATIS-FACTION | TURNOVER RATE | REASONS FOR EXIT | CERTI-FICATION PROGRAM EFFECTIVE-NESS |
| JOB SATISFACTION | 0 | X | X | X |
| TURNOVER RATE | | 0 | X | X |
| REASONS FOR EXIT | X | | 0 | |
| CERTIFICATION PROGRAM EFFECTIVENESS | X | X | | 0 |
| CONTRACTOR ENGAGEMENT DURATION | X | | | |
| CONTRACTOR USAGE | X | | | |
| UNFILLED POSITIONS | X | | | |
| JOB OFFER ACCEPTANCE RATE | | | | X |
| MEASUREMENT SUBTOTAL | 5 | 2 | 2 | 3 |

TABLE 4-continued

SECOND PRIORITIZATION EXAMPLE: PEOPLE MEASUREMENTS

PART B

| PEOPLE MEASUREMENTS | PEOPLE MEASUREMENTS | | | |
|---|---|---|---|---|
| | CONTRACTOR ENGAGEMENT DURATION | CONTRACTOR USAGE | UNFILLED POSITIONS | JOB OFFER ACCEPTANCE RATE |
| JOB SATISFACTION | | X | | |
| TURNOVER RATE | X | X | | |
| REASONS FOR EXIT | | | | |
| CERTIFICATION PROGRAM EFFECTIVENESS | | | | |
| CONTRACTOR ENGAGEMENT DURATION | 0 | | X | |
| CONTRACTOR USAGE | | 0 | X | X |
| UNFILLED POSITIONS | | | 0 | X |
| JOB OFFER ACCEPTANCE RATE | X | X | | 0 |
| MEASUREMENT SUBTOTAL | 2 | 3 | 2 | 2 |

The measurement subtotal is derived from the sum of X's in each of the columns. Those measures that have the highest scores also have the highest number of related measures, making them desirable as measurement for the base model. When prioritized against the results of the behaviors to measurement matrix (Table 3), an initial set of measurements can be identified. The cells with a "0" entry indicate the same measure to same measure condition, which should not be considered in the matrix, because it is not meaningful to relate a measure to itself.

In step 346, the results of the prioritization processes 328 and 330 are used to build the second draft 332 of measurement model 102. The tables built in steps 344 and 345 are used to select those measures that should be included in the final measurement model. A simple approach is to calculate the mean values of measurement subtotals from each of Tables 3 and 4 and select those measures that have scores greater than or equal to that mean.

As an example, in step 344, the mean score is $$[(2+2+2+0+4+4+4+1)/8]=2.375$$

As a result, the following measures would be selected: contractor engagement duration, contractor usage, and unfilled positions. Some measures may need to be included in measurement model 102 in exception of this prioritization process either because of specific customer need or because it may be the only measure that satisfies a particular behavior and/or goal.

The selected measures are then captured in the format described in step 343, Table 2.

In step 347, once the final set of measures has been documented, a gap analysis 103, as previously described in connection with FIG. 4, needs to be done to ensure that linkages are in place between the measurements, processes and organization. In addition, any time a change that results in the addition or deletion of a measurement in the model occurs, the gap analysis step is performed.

ADVANTAGES OVER THE PRIOR ART

It is an advantage of the invention that there is provided a system and method for systematically defining and implementing a measurement program.

It is a further advantage of the invention that there is provided a system and method for implementing a measurement program that is supported by an appropriate organizational structure and that is fully integrated with the organization's processes.

It is a further advantage of the invention that there is provided a system and method for identifying and defining measurements necessary to support the management of an IT organization.

It is a further advantage of the invention that there is provided a system and method for linking defined measurements to organization goals and objectives.

It is a further advantage of the invention that there is provided a system and method of integrating measurement ownership into an organizational model.

It is a further advantage of the invention that there is provided a system and method for integrating measurement data collection into an IT process model.

It is a further advantage of the invention that there is provided a system and method for developing a technical environment for supporting measurement data collection, analysis and reporting.

It is a further advantage of the invention that there is provided a system and method for developing the technical interfaces necessary to support measurement data collection.

It is a further advantage of the invention that there is provided a system and method for developing measurement reporting methods.

It is a further advantage of the invention that there is provided a system and method for developing training and end-user support materials for a measurement system.

ALTERNATIVE EMBODIMENTS

It will be appreciated that, although specific embodiments of the invention have been described herein for purposes of illustration, various modifications may be made without departing from the spirit and scope of the invention. In particular, it is within the scope of the invention to provide a computer program product or program element, or a program storage or memory device such as a solid or fluid transmission medium, magnetic or optical wire, tape or disc, or the like, for storing signals readable by a machine, for controlling the operation of a computer according to the method of the invention and/or to structure its components in accordance with the system of the invention.

Further, each step of the method may be executed on any general computer, such as an IBM System 390, AS/400, PC or the like and pursuant to one or more, or a part of one or more, program elements, modules or objects generated from any programming language, such as C++, Java, P1/1, Fortran or the like. And still further, each said step, or a file or object or the like implementing each said step, may be executed by special purpose hardware or a circuit module designed for that purpose.

Accordingly, the scope of protection of this invention is limited only by the following claims and their equivalents.

We claim:

1. A method for defining the measures of performance of a customer information technology organization, comprising the steps of:
   identifying customer performance goals including behaviors exhibited in meeting said goals;
   building in a computer a measurement model including a plurality of categories in response to said customer performance goals, a plurality of said categories of said model each including a plurality of metrics;
   performing in said computer gap analysis of said model to determine which of said metrics are already collected by said organization and process capabilities for data collection;
   identifying new data collection sources for those metrics which are not already collected by said organization;
   implementing tools and processes for gathering said metrics;
   generating in said computer measurement reports from said metrics;
   said building step including building a first draft measurement model and a second draft measurement model;
   building said first draft measurement model by selectively executing a first prioritization process and a second prioritization process for identifying for each said category a minimum set of metrics;
   said first prioritization process determining for each said metric a relationship with each said behavior satisfied by said metric by building a first table describing for each said category the relationship for each relevant metric with each of said behaviors it may satisfy and determining for each said metric a metric subtotal of satisfied behaviors, and evaluating said table to identify as most desirable metrics those metrics satisfying the greatest number of behaviors; said second prioritization process determining for each said metric a relationship with each other metric by building a second table relating each said metric to each other said metric, determining from said table for each said metric a metric subtotal representing the number of other related metrics, and prioritizing as desirable metrics for each said category in said measurement model those related to the highest number of other related metrics within said category;
   building said second draft measurement model to include a minimum set of metrics that drive desired behaviors by selecting metrics from said first and second prioritization processes prioritized selectively by behaviors satisfied and related metrics by calculating the mean value of metric subtotals from each prioritization table and selecting those metrics having metric subtotals greater than or equal to said mean; and
   selectively including in said measurement model to provide an optimum set of metrics those additional metrics selected as either related to a specific customer need or as an only metric satisfying a particular behavior.

2. The method of claim 1, said building step further comprising the step of:
   selecting as said metrics those which satisfy prioritized behaviors.

3. The method of claim 2, said building step further comprising the step of:
   selecting as said metrics those which also satisfy related metrics.

4. A method for creating and using a measurement model work product, comprising the steps of:
   providing a target future business capabilities work product for defining in a computer database customer goals necessary to achieve through measurements;
   operating a computer processor for translating said customer goals into a measurement model work product including a plurality of categories defining account specific behaviors and metrics that empirically demonstrate said behaviors;
   operating said computer processor for building said measurement model work product by building a first draft measurement model and a second draft measurement model;
   building said first draft measurement model by selectively executing a first prioritization process and a second prioritization process;
   said first prioritization process determining for each said metric a relationship with each said behavior satisfied by said metric by building a first table describing for each said category the relationship for each relevant metric with each of said behaviors it may satisfy and determining for each said metric a metric subtotal of satisfied behaviors, and evaluating said table to identify as most desirable metrics those metrics satisfying the greatest number of behaviors;
   said second prioritization process determining for each said metric a relationship with each other metric by building a second table relating each said metric to each other said metric, determining from said table for each said metric a metric subtotal representing the number of other related metrics, and prioritizing as desirable metrics for each said category in said measurement model those related to the highest number of other related metrics within said category; and
   building said second draft measurement model to include a minimum set of metrics that drive desired behaviors by selecting metrics from said first and second prioritization processes prioritized selectively by behaviors satisfied and related metrics.

5. The method of claim 4, further comprising the step of:
   defining a gap analysis work product specifying differences between said measurement model work product and current customer measurements to identify possible deficiencies in organization measurement processes.

6. A system for creating and using a measurement model work product, comprising:
   a target future business capabilities work product for defining in a computer database customer goals necessary to achieve through measurements; and
   a measurement model work product including a plurality of categories for translating said customer goals into account specific behaviors and measures that empirically demonstrate said behaviors;

a computer for deriving said measurement model work product from a first draft measurement model and a second draft measurement model;

means for performing a first prioritization process and means for performing a second prioritization process for deriving said first draft measurement model;

said first prioritization process determining for each said measure a relationship with each said behavior satisfied by said measure by building a first table describing for each said category the relationship for each relevant measure with each of said behaviors it may satisfy and determining for each said measure a measure subtotal of satisfied behaviors, and evaluating said table to identify as most desirable measures those measures satisfying the greatest number of behaviors;

said second prioritization process determining for each said measure a relationship with each other measure by building a second table relating each said measure to each other said measure, determining from said table for each said measure a measure subtotal representing the number of other related measures, and prioritizing as desirable measures for each said category in said measurement model those related to the highest number of other related measures within said category; and said computer building said second draft measurement model to include a minimum set of measures that drive desired behaviors by selecting measures from said first and second prioritization processes prioritized selectively by behaviors satisfied and related measures.

7. The system of claim 6, further comprising:

a gap analysis work product for specifying differences between said measurement model work product and current customer measurements to identify possible deficiencies in organization measurement processes.

8. A method for defining measurements of performance of a customer information technology organization, comprising the steps of:

collecting into a competency-defined measurement categories and measurements file in a computer database definitions of selected categories of behavioral measurements;

selecting from said file contract measurements;

said contract measurements being selected by operating a digital computer to build a first draft measurement model and a second draft measurement model; building said first draft measurement model including a plurality of categories by said digital computer selectively executing a first prioritization process and a second prioritization process;

said first prioritization process determining for each said contract measurement a relationship with each said behavioral measurement satisfied by said contract measurement by building a first table describing for each said category the relationship for each relevant behavioral measurement with each of said behaviors it may satisfy and determining for each said behavioral measurement a behavioral measurement subtotal of satisfied behaviors, and evaluating said table to identify as most desirable behavioral measurement those behavioral measurement satisfying the greatest number of behaviors;

said second prioritization process determining for each said behavioral measurement a relationship with each other behavioral measurement by building a second table relating each said behavioral measurement to each other said behavioral measurement within each said category, determining from said table for each said behavioral measurement a behavioral measurement subtotal representing the number of other related behavioral measurement, and prioritizing as desirable behavioral measurement for each said category in said measurement model those related to the highest number of other related behavioral measurement within said category;

building said second draft measurement model to include a minimum set of measures that drive desired behaviors by said digital computer selecting behavioral measurements from said first and second prioritization processes prioritized selectively by behaviors satisfied and related behavioral measurements;

implementing said contract measurements; and using and maintaining said contract measurements.

9. The method of claim 8, said categories including human resources, quality, customer, cost and schedule, process, and productivity and output categories of behavioral measurements.

10. System for formulating measurement requirements that are to be implemented in an engagement, comprising:

a current customer measurements work product for detailing in a computer database current measurements being collected and reported by a customer;

a measurement model work product for translating customer goals into account specific behaviors and measures that empirically demonstrate said behaviors;

a computer for deriving said measurement model work product including a plurality of categories from a first draft measurement model and a second draft measurement model;

means for performing a first prioritization process and means for performing a second prioritization process for deriving said first draft measurement model;

said first prioritization process determining for each said measure a relationship with each said behavior satisfied by said measure by building a first table describing for each said category the relationship for each relevant measure with each of said behaviors it may satisfy and determining for each said measure a metric subtotal of satisfied behaviors, and evaluating said table to identify as most desirable measures those measures satisfying the greatest number of behaviors;

said second prioritization process determining for each said measure a relationship with each other measure by building a second table relating each said measure to each other said measure, determining from said table for each said measure a measure subtotal representing the number of other related measures, and prioritizing as desirable measures for each said category in said measurement model those related to the highest number of other related measures within said category;

said computer building said second draft measurement model to include a minimum set of measures that drive desired behaviors by selecting measures from said first and second prioritization processes prioritized selectively by behaviors satisfied and related measures; and a measurement gap analysis work product for defining in said computer database differences between said current measurements and said account specific behaviors and measures.

11. The system of claim 10, further comprising:

an interface agreement work product for documenting expectations for data collection;

a configuration script work product for configuring tools required to implement said requirements;

a contract measurement business policy work product for defining expectations of behavior required to support said requirements; and a scorecard work product for visualizing said requirements.

12. A measurement and performance management method, comprising the steps of:

during a proposal contextual phase, developing in a computer database a measurement solution including assumptions and behavioral expectations for a plurality of categories to be delivered to a customer;

said developing step including operating a digital computer for building a first draft measurement model and a second draft measurement model;

building said first draft measurement model by said digital computer selectively executing a first prioritization process and a second prioritization process;

said first prioritization process determining for each metric of a plurality of metrics a relationship with each behavior satisfied by said metric by building a first table describing for each said category the relationship for each relevant metric with each of said behaviors it may satisfy and determining for each said metric a metric subtotal of satisfied behaviors, and evaluating said table to identify as most desirable metrics those metrics satisfying the greatest number of behaviors;

said second prioritization process determining for each said metric a relationship with each other metric by building a second table relating each said metric to each other said metric, determining from said table for each said metric a metric subtotal representing the number of other related metrics, and prioritizing as desirable metrics for each said category in said measurement model those related to the highest number of other related metrics within said category;

building said second draft measurement model to include a minimum set of measures that drive desired behaviors by operating said digital computer for selecting from said first and second prioritization processes metrics prioritized selectively by behaviors satisfied and related metrics;

during a due diligence phase, validating assumptions and behavioral expectations in said measurement solution; and during a transformation phase, transferring to said customer resources and assets for implementing said measurement solution as validated.

13. The method of claim 12, said developing step comprising the further step of:

building said measurement solution responsive to inputs from a measurement catalog work product and a target future business capabilities work product.

14. The method of claim 13, said validating step comprising the further step of:

executing a measurement gap analysis work product responsive to inputs from a current customer measurements work product, a future process design points work product, a to-be organization design work product and a to-be process design work product.

15. The method of claim 14, said transferring step comprising the further step of:

pursuant to an interface agreement work product, providing an external interface requirements work product, a configuration script work product, a contract measurement business policy work product, a scorecard work product, an end-user training materials work product, and a deployment plan work product.

16. System for formulating measurement requirements that are to be implemented in an engagement, comprising:

means for developing in a computer database a measurement solution to be delivered to a customer;

means for validating in said computer database assumptions and behavioral expectations in said measurement solution;

means for transferring to said customer resources and assets for implementing said measurement solution as validated;

computer means for deriving said measurement solution from a first draft measurement model including a plurality of categories and a second draft measurement model;

means for performing a first prioritization process and means for performing a second prioritization process for deriving said first draft measurement model;

said first prioritization process determining for each of a plurality of metrics a relationship with each said behavior satisfied by said metric by building a first table describing for each said category the relationship for each relevant metric with each of said behaviors it may satisfy and determining for each said metric a metric subtotal of satisfied behaviors, and evaluating said table to identify as most desirable metrics those metrics satisfying the greatest number of behaviors;

said second prioritization process determining for each said metric a relationship with each other metric by building a second table relating each said metric to each other said metric, determining from said table for each said metric a metric subtotal representing the number of other related metrics, and prioritizing as desirable metrics for each said category in said measurement model those related to the highest number of other related metrics within said category; and said computer building said second draft measurement model to include a minimum set of measures that drive desired behaviors by selecting metrics from said first and second prioritization processes for said measurement solution prioritized selectively by behaviors satisfied and related metrics.

17. Method for executing a gap analysis responsive to a measurement model including a plurality of categories and current customer measurements, comprising the steps of:

operating a digital computer to build said measurement model from a first draft measurement model and a second draft measurement model;

building said first draft measurement model by selectively executing a first prioritization process and a second prioritization process;

operating said digital computer during said first prioritization process for determining for each of a plurality of measures a relationship with each of a plurality of behaviors satisfied by said measure by building a first table describing for each said category the relationship for each relevant measure with each of said behaviors it may satisfy and determining for each said measure a measure subtotal of satisfied behaviors, and evaluating said table to identify as most desirable measures those measures satisfying the greatest number of behaviors;

operating said digital computer during said second prioritization process for determining for each said measure a relationship with each other measure by building a second table relating each said measure to each other said measure, determining from said table for each said measure a measure subtotal representing the number of other related measure, and prioritizing as desirable measure for each said category in said measurement model those related to the highest number of other related measure within said category;
operating said digital computer for building said second draft measurement model to include a minimum set of measures that drive desired behaviors by selecting measures from said first and second prioritization processes prioritized selectively by behaviors satisfied and related measures;
mapping in a computer database said current measurement model to said current customer measurements and identifying measurement gaps;
identifying in said computer database measurements not covered by said measurement model;
identifying nonproductive measurements; and
identifying the impact to an organizational structure and processes of said customer of said measurement gaps.

18. A canonical method for defining a measurements model work product, comprising the steps of:
articulating envisioned business goals and behaviors;
operating a computer processor for enumerating and defining behaviors and goals satisfied by said behaviors in a computer database of existing contract metrics including a plurality of categories;
selecting potential metrics for said business goals and behaviors from said database;
operating said computer processor for prioritizing and balancing said potential metrics to determine said measurement model work product;
said prioritizing and balancing including building a first draft measurement model and a second draft measurement model;
building said first draft measurement model by selectively executing within said computer processor a first prioritization process and a second prioritization process;
said first prioritization process determining for each potential metric from said selecting step a relationship with each behavior satisfied by said potential metric by building a first table describing for each said category the relationship for each relevant metric with each of said behaviors it may satisfy and determining for each said metric a metric subtotal of satisfied behaviors, and evaluating said table to identify as most desirable metrics those metrics satisfying the greatest number of behaviors;
said second prioritization process determining for each said potential metric a relationship with each other potential metric from said selecting step by building a second table relating each said metric to each other said metric, determining from said table for each said metric a metric subtotal representing the number of other related metrics, and prioritizing as desirable metrics for each said category in said measurement model those related to the highest number of other related metrics within said category; and
building said second draft measurement model to include a minimum set of measures that drive desired behaviors by selecting potential metrics from said first and second prioritization processes prioritized selectively by behaviors satisfied and related potential metrics.

19. System for defining a measurements model work product, comprising:
a first database for articulating envisioned business goals and behaviors;
a second database for enumerating and defining behaviors and goals satisfied by said behaviors selected from existing contract metrics;
means for selecting potential metrics for said business goals and behaviors from said second database;
prioritizing and balancing means for determining from said potential metrics those metrics to be included in said measurement model work product, said prioritizing and balancing means including means for deriving a first draft measurement model including a plurality of categories and a second draft measurement model;
a first prioritization means and a second prioritization means for deriving said first draft measurement model;
said first prioritization means determining for each said potential metric a relationship with each said behavior satisfied by said potential metric by building a first table describing for each said category the relationship for each relevant metric with each of said behaviors it may satisfy and determining for each said metric a metric subtotal of satisfied behaviors, and evaluating said table to identify as most desirable metrics those metrics satisfying the greatest number of behaviors;
said second prioritization means determining for each said potential metric a relationship with each other potential metric by building a second table relating each said metric to each other said metric, determining from said table for each said metric a metric subtotal representing the number of other related metrics, and prioritizing as desirable metrics for each said category in said measurement model those related to the highest number of other related metrics within said category; and
said prioritizing and balancing means building said second draft measurement model to include a minimum set of measures that drive desired behaviors by selecting potential metrics from said first and second prioritization processes prioritized selectively by behaviors satisfied and related potential metrics.

20. A program storage device readable by a machine, tangibly embodying a program of instructions executable by a machine to perform method steps for defining the measures of performance of a customer information technology organization, said method steps comprising:
identifying customer performance goals;
building a model in response to the customer goals including a plurality of primitive metrics in a plurality of categories;
performing gap analysis of said model to determine which of said primitive metrics are already collected by said organization and process capabilities for data collection;
identifying new data collection sources for those primitive metrics which are not already collected by said organization;
implementing tools and processes for gathering said primitive metrics; and
generating measurement reports from said primitive metrics;
said building step including building a first draft measurement model and a second draft measurement model;
building said first draft measurement model by selectively executing a first prioritization process and a second prioritization process;
said first prioritization process determining for each said primitive metric a relationship with each said behavior satisfied by said primitive metric by building a first table describing for each said category the relationship for each relevant metric with each of said behaviors it may satisfy and determining for each said metric a metric subtotal of satisfied behaviors, and evaluating said table to identify as most desirable metrics those metrics satisfying the greatest number of behaviors;

said second prioritization process determining for each said primitive metric a relationship with each other primitive metric by building a second table relating each said metric to each other said metric, determining from said table for each said metric a metric subtotal representing the number of other related metrics, and prioritizing as desirable metrics for each said category in said measurement model those related to the highest number of other related metrics within said category; and building said second draft measurement model to include a minimum set of measures that drive desired behaviors by selecting primitive metrics from said first and second prioritization processes prioritized selectively by behaviors satisfied and related primitive metrics.

21. A program storage device readable by a machine, tangibly embodying a program of instructions executable by a machine to perform method steps for creating and using a measurement model work product, said method steps comprising:

providing a target future business capabilities work product for defining customer goals necessary to achieve through measurements;

translating said customer goals into a measurement model work product including a plurality of categories defining account specific behaviors and measures that empirically demonstrate said behaviors;

building said measurement model work product by building a first draft measurement model and a second draft measurement model;

building said first draft measurement model by selectively executing a first prioritization process and a second prioritization process;

said first prioritization process determining for each said measure a relationship with each said behavior satisfied by said measure by building a first table describing for each said category the relationship for each relevant measure with each of said behaviors it may satisfy and determining for each said measure a measure subtotal of satisfied behaviors, and evaluating said table to identify as most desirable measures those measures satisfying the greatest number of behaviors;

said second prioritization process determining for each said measure a relationship with each other measure by building a second table relating each said measure to each other said measure, determining from said table for each said measure a measure subtotal representing the number of other related measure, and prioritizing as desirable measure for each said category in said measurement model those related to the highest number of other related measures within said category; and building said second draft measurement model to include a minimum set of measures that drive desired behaviors by selecting measures from said first and second prioritization processes prioritized selectively by behaviors satisfied and related measures.

22. A program storage device readable by a machine, tangibly embodying a program of instructions executable by a machine to perform method steps for defining the measures of performance of a customer information technology organization, said method steps comprising:

collecting into a competency-defined measurement categories and measurements file definitions of selected categories of behavioral measurements of behaviors;

selecting from said file contract measurements;

said contract measurements being selected by building a first draft measurement model and a second draft measurement model;

building said first draft measurement model by selectively executing a first prioritization process and a second prioritization process;

said first prioritization process determining for each said contract measurement a relationship with each said behavioral measurement satisfied by said contract measurement by building a first table describing for each said category the relationship for each relevant contract measurement with each of said behaviors it may satisfy and determining for each said contract measurement a contract measurement subtotal of satisfied behaviors, and evaluating said table to identify as most desirable contract measurements those contract measurements satisfying the greatest number of behaviors;

said second prioritization process determining for each said contract measurement a relationship with each other contract measurement by building a second table relating each said contract measurement to other said contract measurements, determining from said table for each said contract measurement a contract measurement subtotal representing the number of other related contract measurements, and prioritizing as desirable contract measurements for each said category in said measurement model those related to the highest number of other related contract measurements within said category;

building said second draft measurement model to include a minimum set of contract measurements that drive desired behaviors by selecting contract measurements from said first and second prioritization processes prioritized selectively by behaviors satisfied and related contract measurements;

implementing said contract measurements; and using and maintaining said contract measurements.

23. A program storage device readable by a machine, tangibly embodying a program of instructions executable by a machine to perform method steps for providing a measurement and performance management method, said method steps comprising:

during a proposal contextual phase, developing a measurement solution including assumptions and behavioral expectations for a plurality of categories to be delivered to a customer;

said developing step including building a first draft measurement model and a second draft measurement model;

building said first draft measurement model by selectively executing a first prioritization process and a second prioritization process;

said first prioritization process determining for each potential metric of a plurality of potential metrics a relationship with each behavior satisfied by said potential metric by building a first table describing for each said category the relationship for each relevant metric with each of said behaviors it may satisfy and determining for each said metric a metric subtotal of satisfied behaviors, and evaluating said table to identify as most desirable metrics those metrics satisfying the greatest number of behaviors;

said second prioritization process determining for each said potential metric a relationship with each other potential metric by building a second table relating each said metric to each other said metric, determining from said table for each said metric a metric subtotal representing the number of other related metrics, and prioritizing as desirable metrics for each said category in said measurement model those related to the highest number of other related metrics within said category;

building said second draft measurement model to include a minimum set of measures that drive desired behaviors by selecting potential metrics from said first and second prioritization processes prioritized selectively by behaviors satisfied and related potential metrics;

during a due diligence phase, validating assumptions and behavioral expectations in said measurement solution; and during a transformation phase, transferring to said customer resources and assets for implementing said measurement solution as validated.

24. A program storage device readable by a machine, tangibly embodying a program of instructions executable by a machine to perform method steps for executing a gap analysis responsive to a measurement model and current customer measurements, said method steps comprising:

building said measurement model including a plurality of categories from a first draft measurement model and a second draft measurement model;

building said first draft measurement model by selectively executing a first prioritization process and a second prioritization process;

said first prioritization process determining for each of a plurality of measurements a relationship with each of a plurality of behaviors satisfied by said measurements by building a first table describing for each said category the relationship for each relevant measurement with each of said behaviors it may satisfy and determining for each said measurement a measurement subtotal of satisfied behaviors, and evaluating said table to identify as most desirable measurements those measurements satisfying the greatest number of behaviors;

said second prioritization process determining for each said measurement a relationship with each other measurement by building a second table relating each said measurement to each other said measurement, determining from said table for each said measurement a measurement subtotal representing the number of other related measurements, and prioritizing as desirable measurements for each said category in said measurement model those related to the highest number of other related measurements within said category;

building said second draft measurement model to include a minimum set of measures that drive desired behaviors by selecting measurements from said first and second prioritization processes prioritized selectively by behaviors satisfied and related measurements;

mapping said current measurement model to said current customer measurements and identifying measurement gaps;

identifying measurements not covered by said measurement model;

identifying nonproductive measurements; and identifying the impact to an organizational structure and processes of said customer of said measurement gaps.

* * * * *

Disclaimer

6,968,312 B1 — Suzanne M. Jordan, Dallas, TX (US); Patrick W. McMahon, Erie, PA (US); David B. McNeill, Raleigh, NC (US); Nora M. Panlilio-Yap, Ellicott City, MD (US). SYSTEM AND METHOD FOR MEASURING AND MANAGING PERFORMANCE IN AN INFORMATION TECHNOLOGY ORGANIZATION. Patent dated November 22, 2005. Disclaimer filed October 6, 2006, by the assignee, International Business Machines Corporation.

Hereby enters this disclaimer to claims 1-24, of said patent.

(*Official Gazette October 14, 2008*)